(12) United States Patent
Bernard

(10) Patent No.: US 6,754,567 B2
(45) Date of Patent: Jun. 22, 2004

(54) METHOD AND DEVICE FOR TRANSMITTING DATA ON AN AIRCRAFT

(75) Inventor: Denys Bernard, Pelleport (FR)

(73) Assignee: Airbus France, Toulouse (FR)

( * ) Notice: Subject to any disclaimer, the term of this patent is extended or adjusted under 35 U.S.C. 154(b) by 22 days.

(21) Appl. No.: 10/348,915

(22) Filed: Jan. 23, 2003

(65) Prior Publication Data

US 2003/0204556 A1 Oct. 30, 2003

(51) Int. Cl.$^7$ ............................................... G06F 7/00
(52) U.S. Cl. ............................ 701/3; 701/29; 701/36
(58) Field of Search ......................... 701/1, 3, 14, 36, 701/29, 31, 32, 33; 244/75 R, 221, 222, 228, 189

(56) References Cited

U.S. PATENT DOCUMENTS 5,596,332 A * 1/1997 Coles et al. ................ 342/455
6,447,370 B1 * 9/2002 Weldon .......................... 451/6

OTHER PUBLICATIONS

Rea, Jon, "Boeing 777 High Lift Control System", Aerospace and Electronics Conference, Boeing Commercial Airplane Group, Proceedings of the IEEE, New York, pp. 476–483, May 24, 1993.

Halsall, F., "Data Communications, Computer 1–17 Networks and Open Systems", Addison–Wesley, pp. 713–718, 1996.

Tanenbaum, A. S., "Computer Networks", Prentice–Hall, pp. 183–190, 1996.

* cited by examiner

Primary Examiner—Richard M. Camby
(74) Attorney, Agent, or Firm—Stevens, Davis, Miller & Mosher, LLP.

(57) ABSTRACT

The system (1) which is on board an aircraft comprises a device (2) of avionic type, an interface means (3) available to an operator, and a data transmission link (4) capable of connecting together the device (2) and the interface means (3). Moreover, the device (2) and the interface means (3) are formed so as to transmit any numerical value in the form of a corresponding textual message, and the device (2) comprises a means (9) for automatically carrying out, in both directions, the conversion between a numerical value and the corresponding textual message and a means (10) for automatically detecting an anomaly of a textual message transmitted.

17 Claims, 1 Drawing Sheet

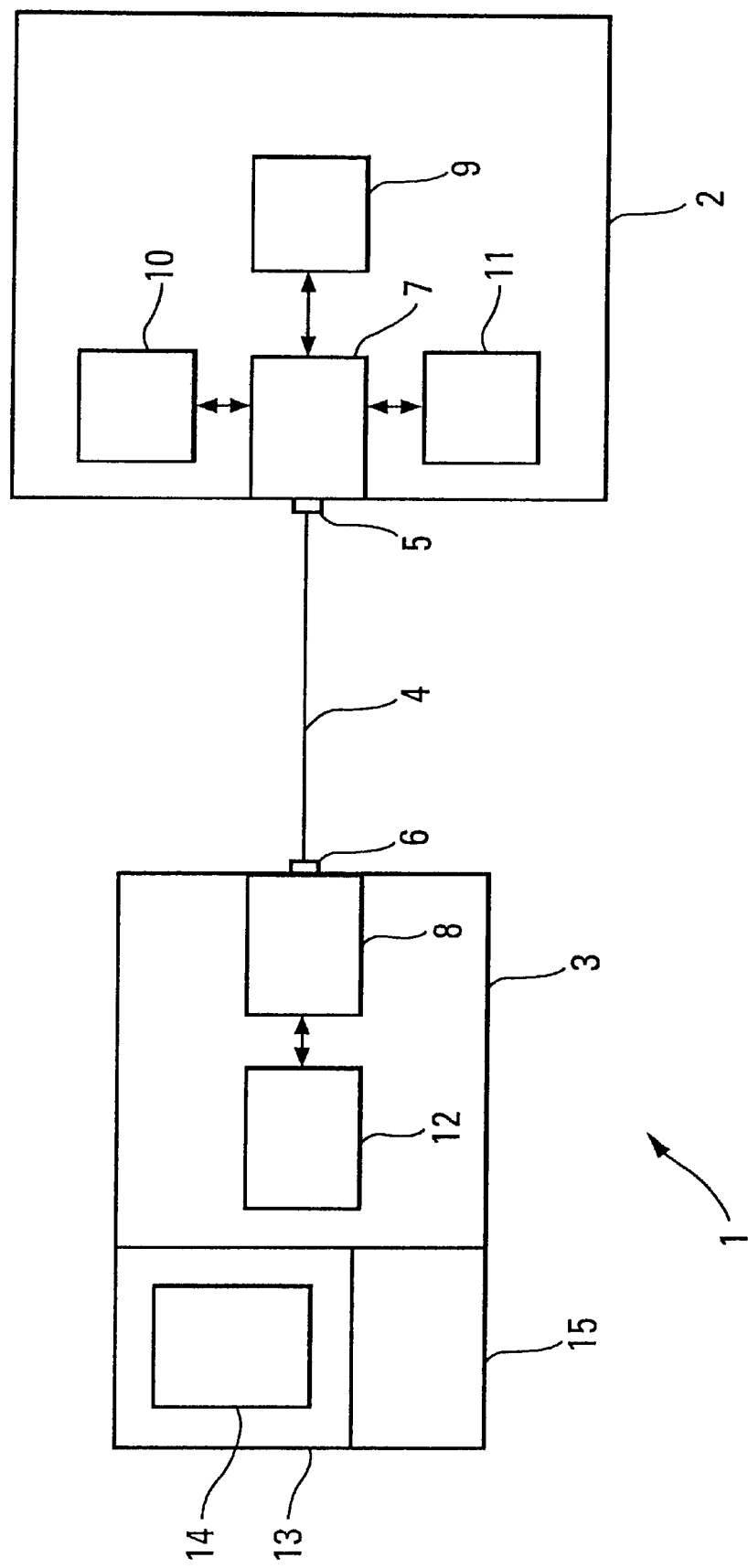

METHOD AND DEVICE FOR TRANSMITTING DATA ON AN AIRCRAFT

FIELD OF THE INVENTION

The present invention relates to a method and a device for transmitting data on an aircraft.

BACKGROUND OF THE INVENTION

It is known that most aircraft currently in service, in particular civil transport airplanes, are equipped with on-board electronic devices, in particular computers of the so-called "avionic type". These electronic devices are used, in particular, for strategic functions of the flight of the aircraft, such as the flight controls. These devices must, consequently, exhibit a very high level of reliability, able to guarantee a lower rate of failure of the aircraft than that demanded by the certifying authorities. The communication networks and the links between such on-board devices (computers) of avionic type must meet the same reliability demands.

Certain modern transport airplanes, such as airplanes of the "Airbus A340-600" and "Airbus A318" type for example, also comprise so-called "open world" on-board equipment, which is not specific to aeronautical applications. This "open world" equipment consists of interface means (of "man/machine" type) available to an operator, in particular a pilot, of the airplane. By way of nonlimiting example, mention may be made of so called industrial computers, portable computers, printers, etc. This "open world" equipment exhibits a lower level of reliability than that of the aforesaid devices of avionic type. It nevertheless exhibits the advantage of being much cheaper than these devices and its level of reliability is sufficient for the applications which are not directly related to maneuvers of the airplane, such as for example the consultation of maintenance documentation or the diagnostic help for aiding maintenance. When an airplane comprises interface means of open world type, it is sometimes beneficial to be able to use one or more of these interface means, to allow an operator to exchange information with devices of anionic type. This may be useful in particular within the framework of the airplane's maintenance operations, so as to consult values of parameters available in devices of avionic type or to test certain components of the airplane (for example: electrical circuits, control surfaces, etc.), the maneuvering of which is controlled by such avionic type devices.

However, even if these maintenance operations exhibit a lesser criticality than that of the flight phases of the aircraft, the level of reliability of said interface means of open world type may not be sufficient in certain cases. Thus, by way of example, when a maintenance operation involves the maneuvering of a control surface, it is vital for the latter not to trigger inadvertently, since inadvertent triggering could be dangerous for personnel located in proximity to said control surface.

Consequently, one is generally strongly discouraged, in particular for reasons of reliability and hence of security, from implementing on an aircraft a transmission of sensitive data between a device of avionic type, such as described above, and an interface means of aforesaid type.

SUMMARY OF THE INVENTION

The object of the invention is to remedy these drawbacks. It relates to a method making it possible to achieve a particularly reliable transmission of data on an aircraft, between at least one device of avionic type and at least one interface means (of "open world" type) which is available to an operator of said aircraft, said device and said interface means being capable of being connected together by way of a data transmission link.

To this end, according to the invention, said method is noteworthy in that in order to transmit at least one numerical value:

a) a textual message corresponding to said numerical value is formed;

b) said textual message is transmitted by way of said data transmission link;

c) said textual message transmitted is analyzed so as to detect any anomaly of said textual message transmitted; and d) unless an anomaly is detected in step c), said textual message transmitted is processed.

Thus:

since by virtue of the invention the numerical value which one wishes to transmit is not transmitted directly, but instead a textual message specified hereinbelow and which corresponds to this numerical value is transmitted; and since an error of transmission of such a textual message can be detected easily and reliably, as specified hereinbelow, it is possible to detect most anomalies in the transmission of data between said device of avionic type and said interface means, thereby making it possible to achieve particularly reliable transmission of data, in both directions. The risk to security is therefore very small.

Furthermore, advantageously, in order to transmit at least one numerical value from said device of avionic type to said interface means:

said device automatically computes, in step a), the textual message corresponding to said numerical value; and/or said interface means displays as it stands at step d) said textual message transmitted. In this case, preferably, the operator must perform a validation operation if he has received this textual message correctly, and/or said interface means automatically analyzes, in step c), said textual message transmitted and, if it detects an anomaly in this step c), it displays an error message in step d).

Moreover, advantageously, in order to transmit at least one numerical value from said interface means to said device, in step a), an operator enters into said interface means:

the textual message directly; or simply said numerical value. In this case:

said interface means displays the textual message corresponding to this numerical value entered, which it proposes to transmit; and said operator must perform a validation operation in order for said interface means to transmit this textual message.

Moreover, advantageously, during the transmission of at least one numerical value from said interface means to said device, in step d):

if no anomaly has been detected in step c), said device automatically converts said textual message transmitted into a corresponding numerical value;

otherwise (detection of an anomaly), it returns a textual message to the interface means, intended to advise an operator of the anomaly.

Furthermore, advantageously, in a variant, in step a):

α) the interface means displays a dispatch order from the operator, relating to the dispatch of a numerical value;

β) the operator is invited to validate or to cancel this order; and

γ) if he validates the order, he is invited to enter a confirmation value and to confirm this entry so that the order is dispatched.

In this case, preferably, in the aforesaid step a), the interface means displays, as regards the dispatch order, simultaneously the numerical value and the corresponding textual message. Thus, if the operator enters the numerical value, the interface means also displays the corresponding textual message, and if the operator enters the textual message, the interface means also displays the numerical value. This makes it possible to guarantee that validation has indeed been effected voluntarily by the operator.

Moreover, in a particular embodiment, in order to transmit at least one numerical value from said interface means to said device:

an operator inputs the numerical value into the interface means and said interface means computes the corresponding textual message;

said interface means transmits this textual message to the device;

said device analyzes said textual message transmitted; and if said device does not detect any anomaly, it sends a validation message to said interface means which displays it.

Furthermore, in another particular embodiment, in order to transmit at least one numerical value from said interface means to said device:

an operator inputs the numerical value into the interface means which transmits it to the device;

said device computes the textual message corresponding to the numerical value received;

said device transmits this textual message to the interface means which displays it; and if the textual message displayed corresponds to the numerical value input initially by the operator, the latter performs a validation operation intended to inform said device that the numerical value received is correct.

According to the invention, in order to transmit said textual message in step b), successively:

b1) said textual message is coded as a corresponding digital message;

b2) said digital message is transmitted by way of said data transmission link of digital type; and b3) the digital message thus transmitted is decoded to form said textual message transmitted.

Thus, by virtue of the invention, the standard digital-type link for data transmission is used to transmit the textual message (which is coded for this purpose digitally).

Furthermore, in order to form the textual message corresponding to said numerical value:

in a first embodiment, each digit of said numerical value is transformed individually into a textual equivalent, the textual message then corresponding to the string of said textual equivalents; and in a second embodiment, said numerical value is transformed as a whole into a textual equivalent which then represents said textual message.

The present invention also relates to a data transmission system on board an aircraft, of the type comprising:

at least one device of avionic type;

at least one interface means available to an operator; and at least one data transmission link capable of connecting together said device and said interface means.

According to the invention, said system is noteworthy in that said device and said interface means are formed so as to transmit any numerical value in the form of a corresponding textual message, and in that said device comprises at least one means for automatically carrying out, in both directions, the conversion between a numerical value and the corresponding textual message and at least one means for automatically detecting an anomaly of the textual message transmitted.

Thus, to obtain, on the basis of an existing (relatively unreliable) system, a data transmission system in accordance with the invention which is especially reliable, it is not necessary according to the invention to modify said existing system much, thereby making it possible in particular to reduce the cost.

Preferably, said interface means comprises a means of display and a means of entry of alphanumeric data.

BRIEF DESCRIPTION OF THE DRAWINGS(S)

The single figure of the appended drawing will elucidate the manner in which the invention may be embodied. This single figure represents the schematic diagram of a data transmission system in accordance with the invention.

PREFERRED EMBODIMENT(S) OF THE INVENTION

The system 1 in accordance with the invention and represented diagrammatically in the figure is intended for the transmission of data on an aircraft (not represented), in particular a civil transport airplane.

More precisely, said system 1 is of the type comprising at least:

one electronic device 2 of avionic type, in particular a computer, for example a flight control computer, which is mounted fixedly on the aircraft and which exhibits a very high level of reliability, able to guarantee a lower rate of failure of the aircraft than that demanded by the certifying authorities;

an interface means 3, for example a portable computer, which is available to an operator of the aircraft, which is of "open world" type, which is also on board the aircraft and which exhibits reduced reliability so as generally not to guarantee the failure rate demanded by the authorities for certifying the aircraft; and a data transmission link 4, of standard type, which can be connected by standard means of connection 5 and 6 provided at its ends, respectively, to the device 2 and to the interface means 3, in such a way as to link the latter together and to allow the implementation of a data transmission between them.

Moreover, said device 2 and said interface means 3 also comprise, each, a standard coding/decoding means 7, 8 for coding a value in numerical form before transmitting it (and of course for decoding a value received).

With such a system of standard type, without the advantageous characteristics in accordance with the present invention, which are presented hereinbelow, a transmission of digital data between the device 2 and the interface means 3 exhibits reduced reliability, insufficient in particular for transmitting information relating directly to the controls of the aircraft, because of the reduced reliability of said interface means 3. Specifically, if an error occurs in the transmission of a value, following a problem at the level of said reduced-reliability interface means 3, one is not in a position to detect it. By way of illustration, mention may be made of the transmission of a parameter whose numerical value is, for example, equal to "2". In digital form, this parameter can be coded (with the help of said means 7 or of said means 8) in the form of a byte whose binary representation is 00000010. Should a disturbance modify the value of one of the bits of this byte, the value transmitted by way of the link 4 (in one of the two directions) may, for example, be 00000011 which represents the value "3". In so far as this value "3" (very close to the value "2" to be transmitted) is entirely plausible for this parameter, nothing (with a data transmission system of standard type) makes it possible to detect this transmission error.

To remedy these drawbacks and obtain a particularly reliable data transmission system 1, according to the invention:

said device 2 and said interface means 3 are formed so as to transmit any numerical value in the form of a corresponding textual message;

said device 2 comprises at least one means of computation 9 associated with said means 7 for automatically carrying out, in both directions, the conversion between a numerical value and the corresponding textual message, and at least one means of detection 10 associated with said means 7 for automatically detecting an anomaly of a textual message transmitted.

More precisely, according to the invention, to transmit at least one numerical value:

a) a textual message corresponding to said numerical value is formed;

b) said textual message is transmitted by way of said data transmission link;

c) said textual message transmitted is analyzed so as to detect any anomaly of said textual message transmitted; and d) unless an anomaly is detected in step c), said textual message transmitted is processed.

Consequently, going back to the aforesaid example according to which one wishes to transmit (from the device 2 to the interface means 3, or vice versa) a numerical value equal to "2", a textual message corresponding to said numerical value "2" is formed (for example automatically by the means of computation 9 in the case of a transmission from the device 2 to the interface means 3). This textual message may for example be "TWO".

This textual message is then coded, by the means 8 or the means 7. In the case of the textual message "TWO", by using the ASCII code ("American Standard Code for Information Interchange") for example, said textual message is transformed in such a way as to comprise the following three bytes: 01010100, 01010111, 01001111. Should an anomaly modify the value of one of the bits of the third byte during the transmission of this textual message, the third byte received may, for example, be 01001110 which represents the letter "N". The textual message received is then "TWN", which has no meaning in respect of the relevant parameter. This anomaly can then be easily detected in the transmission of the data.

Thus:

since by virtue of the invention the numerical value ("2") which one wishes to transmit is not transmitted directly, but rather a textual message ("TWO") corresponding to this numerical value ("2") is transmitted; and since an error of transmission of such a textual message ("TWO") may be detected easily and reliably, it is possible to detect most anomalies in the transmission of data between said device 2 of avionic type and said interface means 3, thereby making it possible to achieve particularly reliable transmission of data, in both directions. The risk to security is therefore very small.

According to the invention, to form the textual message corresponding to said numerical value:

in a first embodiment, each digit of said numerical value is transformed individually into a textual equivalent, the textual message then corresponding to the string of said textual equivalents. The numerical value "259" can thus be transformed into the textual message "TWO FIVE NINE"; and in a second embodiment, said numerical value is transformed as a whole into a textual equivalent which then represents said textual message. For example, the numerical value "259" can be transformed, in this second embodiment, into the textual message "TWO HUNDRED FIFTY NINE". The number of symbols (characters) transmitted being higher in this second embodiment, it follows that the rate of detection of errors or of anomalies is even higher than in the case of said first embodiment.

It will moreover be noted that the coding/decoding means 7 and 8 can use, within the framework of the present invention, instead of the aforesaid ASCII code, other known codes, such as the EBCDIC code or the ANSI code for example.

In the case of a transmission of data from the interface means 3 to the device 2, any anomaly in the textual message transmitted is detected, automatically, by said means of detection 10 of the device 2.

In this case:

if no anomaly is detected by the means 10, the means 9 of the device 2 automatically convert the textual message (for example "TWO") transmitted by way of the link 4 into a corresponding numerical value ("2" in the aforesaid example); and if the means 10 detects an anomaly in the textual message ("TWN" for example) transmitted, the device 2 returns, with the aid of an appropriate means 11, via said link 4, textual information to said interface means 3, said information being intended to advise an operator of the anomaly. The operator might then attempt a new sending of this numerical value.

On the other hand, in the case of a transmission in the reverse direction (from the device 2 to the interface means 3), said anomaly may be detected at the interface means 3:

automatically by a means of detection 12 which is integrated into said interface means 3 and which is similar to said means of detection 10; and/or visually by an operator. To this end, the interface means 3 comprises a display means 13, of standard type, which automatically displays on a screen 14 the textual message transmitted, such as it was received from the device 2.

Provision may moreover be made for the operator to have to perform a validation operation if he has received this textual message correctly.

Said display means 13 also displays on the screen 14, as the case may be, textual information originating from the means 11, so as to warn the operator of an anomaly, such as stated above.

It will be noted that, according to the invention, in order to transmit at least one numerical value from said device 2 to said interface means 3, said means of computation 9 of the device 2 automatically computes [in the aforesaid step a)] the textual message corresponding to said numerical value.

Moreover, to transmit at least one numerical value from said interface means 3 to said device 2, an operator enters with the help of a data entry means 15, preferably an alphanumeric keypad, which is associated with said (or integrated into said) interface means 3:

the textual message directly into said interface means 3; or simply said numerical value. In this case, in a particular embodiment:

said interface means 3 displays on the screen 14 the corresponding textual message which it proposes to transmit; and said operator must perform a validation operation, for example with the help of the means 15 or of a specific means (not represented), so that said interface means 3 transmits this textual message.

In another (preferred) embodiment, in order to transmit a numerical value from the interface means 3 to the device 2, in the aforesaid step a):

α) the interface means 3 displays on the screen 14 a dispatch order from the operator, relating to the dispatch of said numerical value;

β) the operator is invited to validate or to cancel this order, for example with the help of the means 15; and γ) if he validates the order, he is invited to enter a confirmation value and to confirm this entry (for example also with the help of said means 15) so as to trigger the transmission of said numerical value.

In this case, preferably, in said step α), the interface means 3 displays on the screen 14, as regards the dispatch order, simultaneously the numerical value and the corresponding textual message. Thus, if the operator enters the numerical value, the interface means 3 also displays the corresponding textual message, and if the operator enters the textual message, the interface means 3 also displays the numerical value. This makes it possible to guarantee that validation has indeed been effected voluntarily by the operator.

Moreover, in a particular embodiment, in order to transmit at least one numerical value from said interface means 3 to said device 2:

an operator inputs the numerical value into the interface means 3 and said interface means 3 computes the corresponding textual message;

said interface means 3 transmits this textual message to the device 2;

said device 2 analyzes said textual message transmitted;

if said device 2 does not detect any anomaly, it sends a validation message to said interface means 3 which displays it.

Furthermore, in another particular embodiment, in order to transmit at least one numerical value from said interface means 3 to said device 2:

an operator inputs the numerical value into the interface means 3 which transmits it to the device 2;

said device 2 computes the textual message corresponding to the numerical value received;

said device 2 transmits this textual message to the interface means 3 which displays it; and if the textual message displayed corresponds to the numerical value input initially by the operator, the latter performs a validation operation intended to inform said device 2 that the numerical value received is correct.

What is claimed is:

1. A method for transmitting data on an aircraft between at least one device (2) of avionic type and at least one interface means (3) which is available to an operator of said aircraft, said device (2) and said interface means (3) being capable of being connected together by way of at least one data transmission link (4), wherein, in order to transmit at least one numerical value:

a) a textual message corresponding to said numerical value is formed;

b) said textual message is transmitted by way of said data transmission link (4);

c) said textual message transmitted is analyzed so as to detect any anomaly of said textual message transmitted; and d) unless an anomaly is detected in step c), said textual message transmitted is processed.

2. The method as claimed in claim 1, wherein, in order to transmit at least one numerical value from said device (2) to said interface means (3), said device (2) automatically computes, in step a), the textual message corresponding to said numerical value.

3. The method as claimed in claim 1, wherein, during the transmission of at least one numerical value from said device (2) to said interface means (3), said interface means (3) displays as it stands at step d) said textual message transmitted.

4. The method as claimed in claim 3, wherein the operator must perform a validation operation if he has received this textual message correctly.

5. The method as claimed in claim 1, wherein, during the transmission of at least one numerical value from said device (2) to said interface means (3), said interface means (3) automatically analyzes, in step c), said textual message transmitted and, if it detects an anomaly in this step c), it displays an error message in step d).

6. The method as claimed in claim 1, wherein, in order to transmit at least one numerical value from said interface means (3) to said device (2), in step a), an operator enters said textual message directly into said interface means (3).

7. The method as claimed in claim 1, wherein, in order to transmit at least one numerical value from said interface means (3) to said device (2), in step a):

an operator enters said numerical value into said interface means (3);

said interface means (3) displays the corresponding textual message which it proposes to transmit; and said operator must perform a validation operation in order for said interface means (3) to transmit this textual message.

8. The method as claimed in claim 1, wherein, in order to transmit at least one numerical value from said interface means (3) to said device (2), in step a):

α) said interface means (3) displays a dispatch order from the operator, relating to the dispatch of said numerical value;

β) the operator is invited to validate or to cancel this order; and

γ) if he validates the order, he is invited to enter a confirmation value and to confirm this entry so that the order is dispatched.

9. The method as claimed in claim 8, wherein, in step α), the interface means displays, as regards the dispatch order, simultaneously the numerical value and the corresponding textual message.

10. The method as claimed in claim 1, wherein, during the transmission of at least one numerical value from said interface means (3) to said device (2), in step d):

if no anomaly has been detected in step c), said device (2) automatically converts said textual message transmitted into a corresponding numerical value;

otherwise, it returns a textual message to the interface means (3), intended to advise an operator of the anomaly.

11. The method as claimed in claim 1, wherein, in order to transmit at least one numerical value from said interface means (3) to said device (2):

an operator inputs the numerical value into the interface means (3) and said interface means (3) computes the corresponding textual message;

said interface means (3) transmits this textual message to the device (2);

said device (2) analyzes said textual message transmitted; and if said device (2) does not detect any anomaly, it sends a validation message to said interface means (3) which displays it.

12. The method as claimed in claim 1, wherein, in order to transmit at least one numerical value from said interface means (3) to said device (2):

an operator inputs the numerical value into the interface means (3) which transmits it to the device (2);

said device (2) computes the textual message corresponding to the numerical value received;

said device (2) transmits this textual message to the interface means (3) which displays it; and if the textual message displayed corresponds to the numerical value input initially by the operator, the latter performs a validation operation intended to inform said device (2) that the numerical value received is correct.

13. The method as claimed in claim 1, wherein, in order to transmit said textual message in step b):

b1) said textual message is coded as a corresponding digital message;

b2) said digital message is transmitted by way of said data transmission link (4) of digital type; and b3) the digital message thus transmitted is decoded to form said textual message transmitted.

14. The method as claimed in claim 1, wherein, in order to form the textual message corresponding to said numerical value, each digit of said numerical value is transformed individually into a textual equivalent, the textual message then corresponding to the string of said textual equivalents.

15. The method as claimed in claim 1, wherein, in order to form the textual message corresponding to said numerical value, said numerical value is transformed as a whole into a textual equivalent which then represents said textual message.

16. A data transmission system on board an aircraft, said system (1) comprising:

at least one device (2) of avionic type;

at least one interface means (3) available to an operator; and at least one data transmission link (4) capable of connecting together said device (2) and said interface means (3), wherein said device (2) and said interface means (3) are formed so as to transmit any numerical value in the form of a corresponding textual message, and wherein said device (2) comprises at least one means (9) for automatically carrying out, in both directions, the conversion between a numerical value and the corresponding textual message and at least one means (10) for automatically detecting an anomaly of a textual message transmitted.

17. The system as claimed in claim 16, wherein said interface means (3) comprises a means of display (13) and a means of entry (15) of alphanumeric data.

\* \* \* \* \*